Aug. 21, 1945.  C. D. RYDER  2,383,164
MECHANICAL NUT
Filed Feb. 24, 1944

INVENTOR.
Charles D. Ryder
BY

Patented Aug. 21, 1945

2,383,164

UNITED STATES PATENT OFFICE 2,383,164

MECHANICAL NUT

Charles D. Ryder, Covington, Ky., assignor to The Grote Manufacturing Company, Bellevue, Ky., a corporation of Kentucky Application February 24, 1944, Serial No. 523,674

7 Claims. (Cl. 85—36)

The invention relates to an improved nut for screw bolts and screws having either machine or wood screw threads and productive as a sheet metal stamping.

An object of the invention is to produce a mechanical nut from sheet metal, as a stamping machine product, a facility for increasing speed of production, and effective for a material reduction in weight and cost over the conventional block type for machine thread screws and smooth studs, and which is applicable to screws having either machine or wood screw threads. For the smaller screw sizes it is particularly admirable for the fastening together of sheet material, being resistant to self-release, as capable of tensionally impinging the stud or shank of the bolt or screw when compressed by the tightening pressure of the screw binding itself to the screw against movement independent thereof.

Further objects and advantages of the invention will be more fully set forth and apparent from the following description of the accompanying drawing, forming a part hereof, and illustrating a preferred embodiment of the invention, in which.

Figure 1:
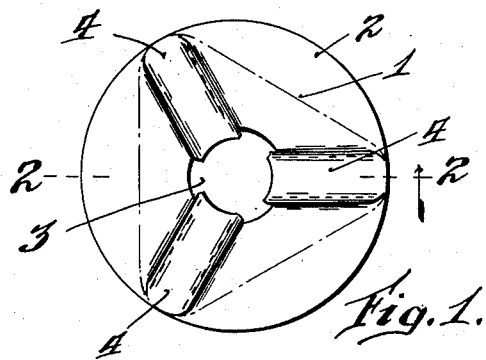
Figure 1 is a top plan view of the improved mechanical nut.
Figure 2:
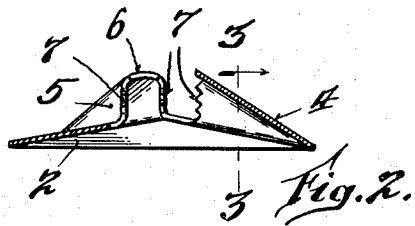
Figure 2 is a section on line 2, 2, Figure 1.
Figure 3:
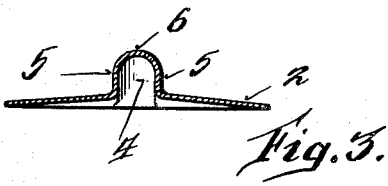
Figure 3 is a section on line 3, 3, Figure 2.
Figure 4:
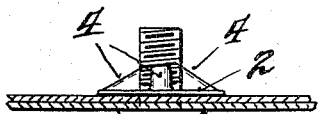
Figure 4 is a side elevation of the nut, in connection with a screw bolt and in application of securing together metal sheets.

Referring to the drawing, the nut preeminently is disclosed as of circular outline or configuration, although it may be of triangular outline as indicated in dot and dash lines 1, in Figure 1. Its outline configuration therefore is optional and may be developed for ornate purposes or to give additional functional characteristics thereto.

The nut, as an integral sheet metal structure, comprises: a base 2, slightly convexed, having a central aperture 3, therethrough of a diameter to clear a machine threaded shank or stem of a screw bolt for which the nut is sized. A plurality of ridges 4, as jaws, are pressed to extend from the face side of the base and radially thereof, each inclined or tapering from outer edge or rim of the base, with which they merge, giving the nut a conical aspect. Such form provides for a greater cross sectional dimension at the inner end or edges of the ridges for an extended length of cooperation with the threads of the screw and comparative to that of a solid block nut an abutment for the screw.

The jaws or ridges duplicate each other and each is of U-shape or channel form in cross section, with the channel open to the underside of the base of the nut and due to its inclined formation particularly at its inner end provides a pair of spaced side walls 5, 5, perpendicular to the base and joined by a transverse wall 6. The wall 6, has its forward edge concaved to grip the stem of the screw at the base of the threads, for obtaining a clutching or biting hold thereon or thereagainst when the base of the nut bears against the work and is subjected to a compressive stress imposed by the tightening pressure of the screw, to resist self-release of the nut upon the screw. It can be clinched to the screw against loosening under the most severe vibration or jarring. The front perpendicular edge 7, of each side wall of the jaw is serrated or toothed for an intermeshing or threading engagement with the threads of the screw.

The triple number of jaws, as illustrated, provides a balanced and symmetric arrangement, and an approximate uniform spacing of the side wall of the jaws offering ample thread bearing upon the screw to prevent undue canting of the nut or interference to its free and quick threading thereon.

The jaws or ridges are preferably of relative varying elevation proportional to the pitch of the thread of the screw, to bring the inner end of the cross walls of the several jaws, as tangs, all into appropriate registry between the threads of the screw for a more accurate fitting and refinement and for uniform and equal effectiveness.

It is obvious that the number of jaws is optional, as for example, four in relative right angle pairs can be employed; the triple number, however, is more favorable for the smaller size of nuts, for example, as gauged for a $\frac{3}{16}$" stove bolt the nut has a spread or diameter of about $\frac{1}{2}$" and the width of the jaws and their relative spacing at their inner end is approximately equal. For such size, for some classes of work, the nut is very effective without the serrations in the front edges of the side walls of the jaws, and a smooth threading engagement is had upon the screw by the transverse walls alone, due to the relative differential heights of the jaws to accommodate for the thread pitch. The triple number of jaws also permits of the formations of the nut from a size and pattern of sheet metal blank without stress or stretch of the metal, effecting injury or weaknesses of the metal.

The cavities exposed to the underside of the nut resulting from its structural formation of the ridges are of advantage for fastening sheet metal as it permits thin gauge sheets to be hammer punched, with the cavities socketing the burrs or tangs produced thereby and projecting from the reverse side of the joined sheets.

Having described my invention, I claim:

1. A sheet metal mechanical nut, comprising: a disk having a central opening and a plurality of circumferentially spaced ridges of U-shaped cross section on one side of the disk and extending radially from the edge of said control opening, the ridges inclined longitudinally and merging with the rim of the base, giving conical shape to the nut, the inner edges of the sides as well as the curved edge of the trough adjacent the opening of each of the ridges being adapted for cooperation with the threads of a screw traversing said opening in the disk.

2. A sheet metal mechanical nut, comprising: a centrally perforated disk having on one side a plurality of ridges of U-shaped cross-section, uniformly spaced about the central perforation and extending radially from the edge of said perforation, the inner ends of the ridges overlying the disk perforation and the inner ends of the side walls thereof serrated for a mating engagement with the threads of a screw traversing the inner ends of the ridges.

3. A sheet metal mechanical nut, comprising: a centrally perforated disk having on one side, a plurality of ridges of U-shaped cross section, uniformly spaced about the central perforation and extending radially from the edge of said perforation, the inner edges of the side walls of the ridges serrated for a mating engagement with the threads of a screw traversing the inner ends of the ridges, and the transverse crown, connecting the side walls respectively of each ridge and at its inner end thereof extended and relatively in a line corresponding with the pitch of the threads of the screw for engagement therewith at the base of the threads.

4. An article of manufacture of the nature disclosed, comprising: a convex disk having a central opening therethrough for the passage of the shank of a screw and the like and a plurality of ridges on the one convex side of the disk of U-shaped cross section, uniformly spaced circumferentially about the central opening and extending radially from the edge of said central opening, the inner edges of the side walls of the ridges each in a line adapted to abut a side of a shank of a screw passing between the inner edges of the ridges and serrated for cooperation with the threads thereof.

5. An article of manufacture of the nature disclosed, comprising: a disk having a central opening therethrough for the passage of the shank of a screw and the like and a plurality of ridges on one side of the disk of U-shaped cross section, uniformly spaced circumferentially about the central opening and extending radially from the edge of said central opening, the inner edges of the side wall and the curved ends of the ridges about the central opening being adapted to abut the surface of a shank of a screw passing between the inner edges of the ridges and the inner edges of said side walls serrated for cooperation with the threads of the screw.

6. An article of manufacture of the nature disclosed, comprising: a convex disk having a central opening therethrough for the passage of a shank of a screw and the like and a plurality of ridges on the convex side of the disk of U-shaped cross section, uniformly spaced circumferentially about the central opening and extending radially from the edge of said central opening, the inner edges of the side walls of the ridges about the central opening being adapted to abut the surface of a shank of a screw passing between the inner edges of the ridges and serrated for cooperation with the threads thereof, with the portion of each of the ridges connecting the sides thereof providing a transverse shank gripping and thread cooperating edge.

7. A sheet metal mechanical nut, comprising: a centrally perforated convexed disk having a plurality of ridges on the convex side of U-shaped cross section, uniformly spaced circumferentially about the central perforation and extending radially from the edge of said central perforation, the ridges inclined longitudinally and merging with the rim of the disk and of a number giving frusto-conical form to the nut, the inner edges of the side walls of the ridges about the central perforation being adapted to abut the surface of a shank passing between the inner edges of the ridges and together with the transverse portion connecting the sides of each of the ridges providing shank gripping edges.

CHARLES D. RYDER.